(12) United States Patent
Siemens

(10) Patent No.: US 6,970,706 B2
(45) Date of Patent: Nov. 29, 2005

(54) HIERARCHICAL CALL CONTROL WITH SELECTIVE BROADCAST AUDIO MESSAGING SYSTEM

(75) Inventor: Gerhard Siemens, Round Rock, TX (US)

(73) Assignee: Siemens Communications, Inc., Boca Raton, FL (US)

( * ) Notice: Subject to any disclaimer, the term of this patent is extended or adjusted under 35 U.S.C. 154(b) by 694 days.

(21) Appl. No.: 09/731,330

(22) Filed: Dec. 5, 2000

(65) Prior Publication Data

US 2002/0068552 A1 Jun. 6, 2002

(51) Int. Cl.[7] ............................................... H04Q 7/20
(52) U.S. Cl. ........................... 455/435.3; 455/426.1; 455/445; 455/435.1; 379/88.19; 379/88.21; 379/142.06; 370/376; 370/351
(58) Field of Search ............................... 455/465, 441, 455/461, 462, 555, 415, 458, 567, 435.3, 426.1, 426.2, 435.1, 428, 552, 445; 379/88.19, 88.21, 142.06, 159; 375/202; 370/351, 376

(56) References Cited

U.S. PATENT DOCUMENTS

| | | | |
|---|---|---|---|
| 4,682,351 A * | 7/1987 | Makino ...................... 455/463 |
| 5,541,980 A | 7/1996 | Urewicz ...................... 379/61 |
| 5,559,860 A * | 9/1996 | Mizikovsky ................ 455/413 |
| 5,771,457 A * | 6/1998 | Tsutsui ...................... 455/463 |
| 6,029,071 A * | 2/2000 | Bertocci et al. ............. 455/463 |
| 6,078,574 A | 6/2000 | Boetzel et al. .............. 370/337 |
| 6,088,338 A | 7/2000 | Rossella et al. ............ 370/294 |
| 6,373,374 B1 * | 4/2002 | Siemens ................. 340/309.8 |
| 6,484,037 B1 * | 11/2002 | Schmidt et al. ............. 455/514 |
| 6,516,200 B1 * | 2/2003 | Schmidt et al. ............. 455/518 |
| 6,519,335 B1 * | 2/2003 | Bushnell ................. 379/215.01 |
| 6,597,905 B1 * | 7/2003 | Hijii ........................... 455/415 |
| 6,665,534 B1 * | 12/2003 | Conklin et al. ............. 455/417 |
| 6,671,370 B1 * | 12/2003 | Heinonen et al. ...... 379/373.02 |

FOREIGN PATENT DOCUMENTS

| | | |
|---|---|---|
| EP | 0 837 611 A2 | 4/1998 |
| EP | 0 837 611 A3 | 5/2000 |
| WO | WO 98/24218 | 6/1998 |

OTHER PUBLICATIONS

European Telecommunication Standard, "Radio Equipment and Systems (RES); Digital European Cordless Telecommunications (DECT) Common Interface, Part 2: Physical Layer", ETS 300 175–2, Oct. 1992.

European Telecommunication Standard, "Radio Equipment and Systems (RES); Digital European Cordless Telecommunications Common Interface", ETS 300 175–3, Oct. 1992.

* cited by examiner

*Primary Examiner*—William Trost
*Assistant Examiner*—Danh C Le

(57) ABSTRACT

A cordless digital telephone system which allows hierarchical call control in a cordless phone system is provided. Based upon a priority level associated with the identified phone number, a call controller unit directs the call to a selected one of a plurality of mobile units in communication with the base station, or a group of mobile units, or in some cases, at a highest priority level, broadcasts the call to all mobile units. In those cases where the phone number is not identifiable as being associated with a particular priority, then a lowest priority is set for that call in which case a predefined message is sent to the caller and the call is dropped. In this way, since in a broadcast mode a user does not have the chance to prevent a ring an unwanted call can be diverted based upon a priority level such as, for example, a "Do not disturb" priority level for calls and broadcasts.

24 Claims, 11 Drawing Sheets

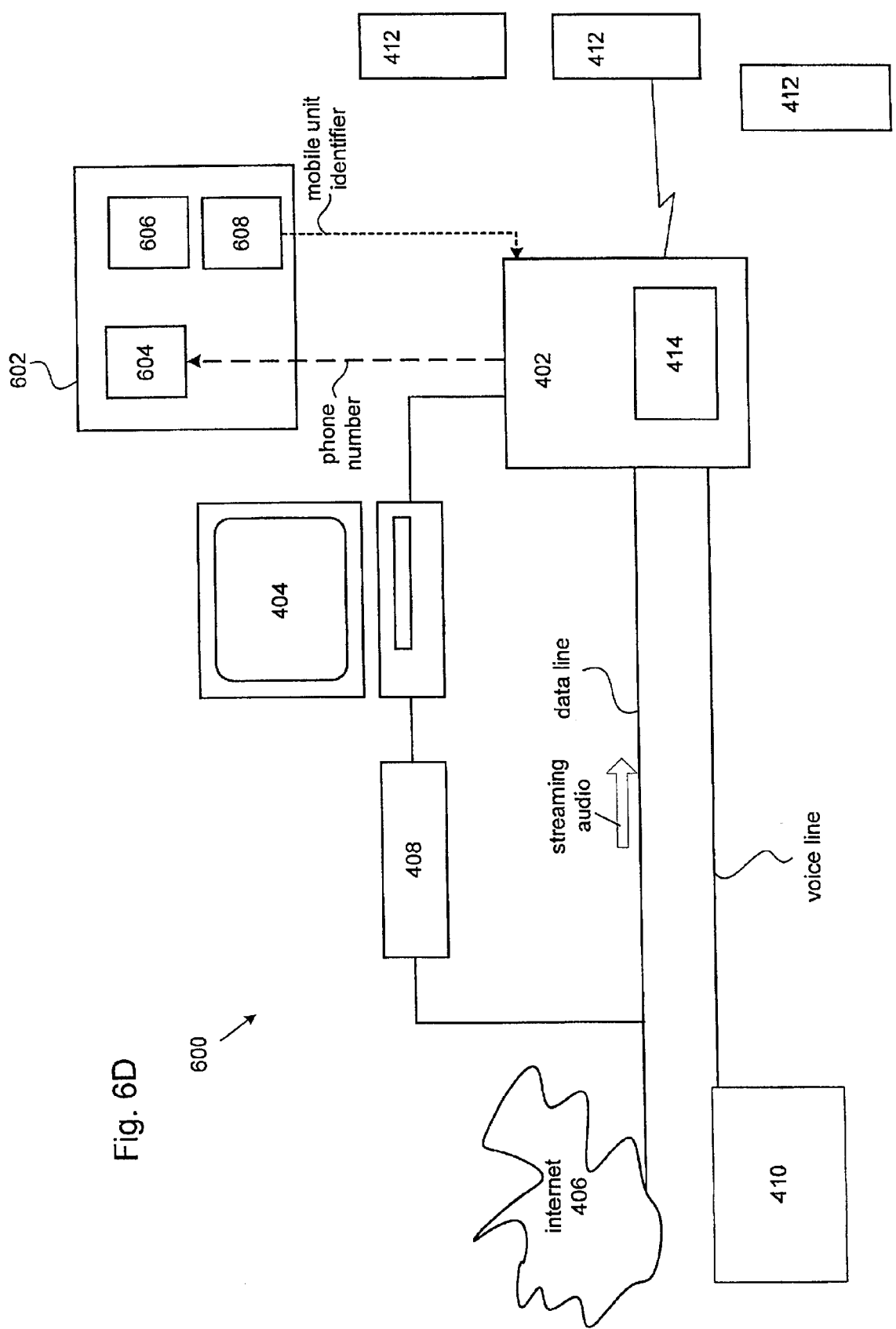

HIERARCHICAL CALL CONTROL WITH SELECTIVE BROADCAST AUDIO MESSAGING SYSTEM

BACKGROUND OF THE INVENTION

1. Field of the Invention

The present invention relates to personal telephone systems that are able to transmit and receive digital signals between fixed sets and fixed stations in a cordless system. More particularly, the present invention relates to providing a hierarchical call control with a selective broadcast messaging service in a cordless telephone system.

2. Description of the Related Art

Time division multiple access (TDMA) cordless phone systems provide a base unit which is able to provide connections for a plurality of mobile units, such as handsets. Such TDMA systems use time division to provide a plurality of slots, where the base (fixed part (FP)) transmits to an individual (portable unit (PP)) mobile unit during a particular slot of time and receives from the individual mobile unit during a particular slot of time. One standard for TDMA systems is the Digital European Cordless Telecommunications DECT Common interface standard described in ETS 300 175-2 and ETS 300 175-3, published by the European Telecommunication Standards Institute. The DECT standard is also discussed in U.S. Pat. No. 6,078,574 entitled "PROCESS AND APPARATUS FOR ACTION CONTROL IN A TIME SLOT METHOD", to Boetzel et al. issued Jun. 20, 2000 and U.S. Pat. No. 6,088,338 entitled "METHOD AND SYSTEM FOR THE DETERMINATION OF THE PSCN PARAMETER STARTING FROM THE MFN PARAMETER IN A DECT CORDLESS TELEPHONE SYSTEM" to Rossella et al. issued Jul. 11, 2000, which are incorporated by reference Generally, the DECT standard does not provide a specification to send a voice message to all mobile units simultaneously as a broadcast.

This unfortunate lack of a capability to simultaneously send a voice message to all mobile units associated with a base unit as a broadcast precludes providing a real time hierarchical call control system in a cordless system. For example, most people do not want to be disturbed by telemarketers, poll takers, solicitors, and other telephone calls of such a commercial nature. In addition to unwanted commercial calls, there are times when a consumer would like to be able to identify an unwanted caller (be it personal or business) and not pick up the phone.

Unfortunately, since conventional cordless telephone systems do not provide a broadcast mode, it is impossible for a base station to send a call from an identified caller to only a specific mobile unit. Conventional cordless systems are also incapable of broadcasting a message that is deemed to be an important message to all, or even a selected group, of mobile units.

Therefore, in a cordless phone system having a base station and a plurality of mobile units, it is desirable to provide a mechanism whereby an identified call is sent only to a specified mobile unit whereas an important call is broadcast to most of the mobile units and a mechanism whereby a broadcast message is delivered to only selected mobile units.

SUMMARY OF THE INVENTION

To achieve the foregoing and other objects and in accordance with the purpose of the present invention a method for providing a hierarchical call control paradigm in a cordless telephone system is described. The inventive hierarchical call control controls incoming calls depending on their phone number or settings that the customer programs into his system i.e. that he does not want to be disturbed by broadcast.

Generally, a cordless telephone base unit receives an incoming call and identifies the phone number corresponding to the received call. Based upon a priority level associated with the identified phone number, a call controller unit directs the call to a selected one of a plurality of mobile units in communication with the base station, or a group of mobile units, or in some cases, at a highest priority level, broadcasts the call to all mobile units. In those cases where the phone number is not identifiable as being associated with a particular priority, then a lowest priority is set for that call in which case a predefined message is sent to the caller and the call is dropped.

In another embodiment, a system for providing a hierarchical call control paradigm in a cordless phone system is disclosed. The system includes a base station operable in a broadcast mode and a standard mode. The system also includes a plurality of mobile units communicatively coupled to the base station, a directory server coupled to the base station, a phone number database included in or coupled to the directory server arranged to store any number of phone numbers, and a caller identification database coupled to the phone number database arranged to store a caller identifier uniquely associated with a phone number corresponding to a received phone call. The system further includes a priority level data base coupled to the caller identification data base arranged to provide a priority level for the caller identifier. In a preferred embodiment, when the phone call is received, the directory server identifies a phone number of the received call, identifies a caller based upon a retrieved caller identifier associated with the identified phone number, retrieves a priority level for the identified caller, and forwards the call to a specific mobile unit based upon the priority level.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6D shows the situation in some cases where a broadcast message is received by the base station in accordance with an embodiment of the invention.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In one embodiment of the invention, a base unit receives a phone call and based upon the associated phone number, assigns a priority level to the call. If the priority is a low priority, then the caller is sent a predefined message and the call is dropped. If, however, the priority is a high priority, then all mobile units in communication with the base station receive the message. In those cases where the priority is an intermediate priority, then a determination is made of a specific one of the plurality of mobile units in communication is assigned to receive the call based upon the associated phone number. In that case, the specific mobile unit receives the call while the other mobile units do not.

In the situation where a broadcast message, such as, for example, a streaming audio, radio, or any communication designed to be heard by a substantial number of the plurality of mobile units, is received by the base station, those mobile units designated to receive the broadcast receive the signal from the base station.

In this way, the inventive cordless telephone system provides the capability providing a hierarchical call control as well as selectively broadcasting to only certain mobile units associated with the particular base station.

The invention will now be described in terms of a digital cordless phone system having a base station communicatively coupled to any number of associated mobile units. Each of the mobile units has associated with it a user.

Figure 1:
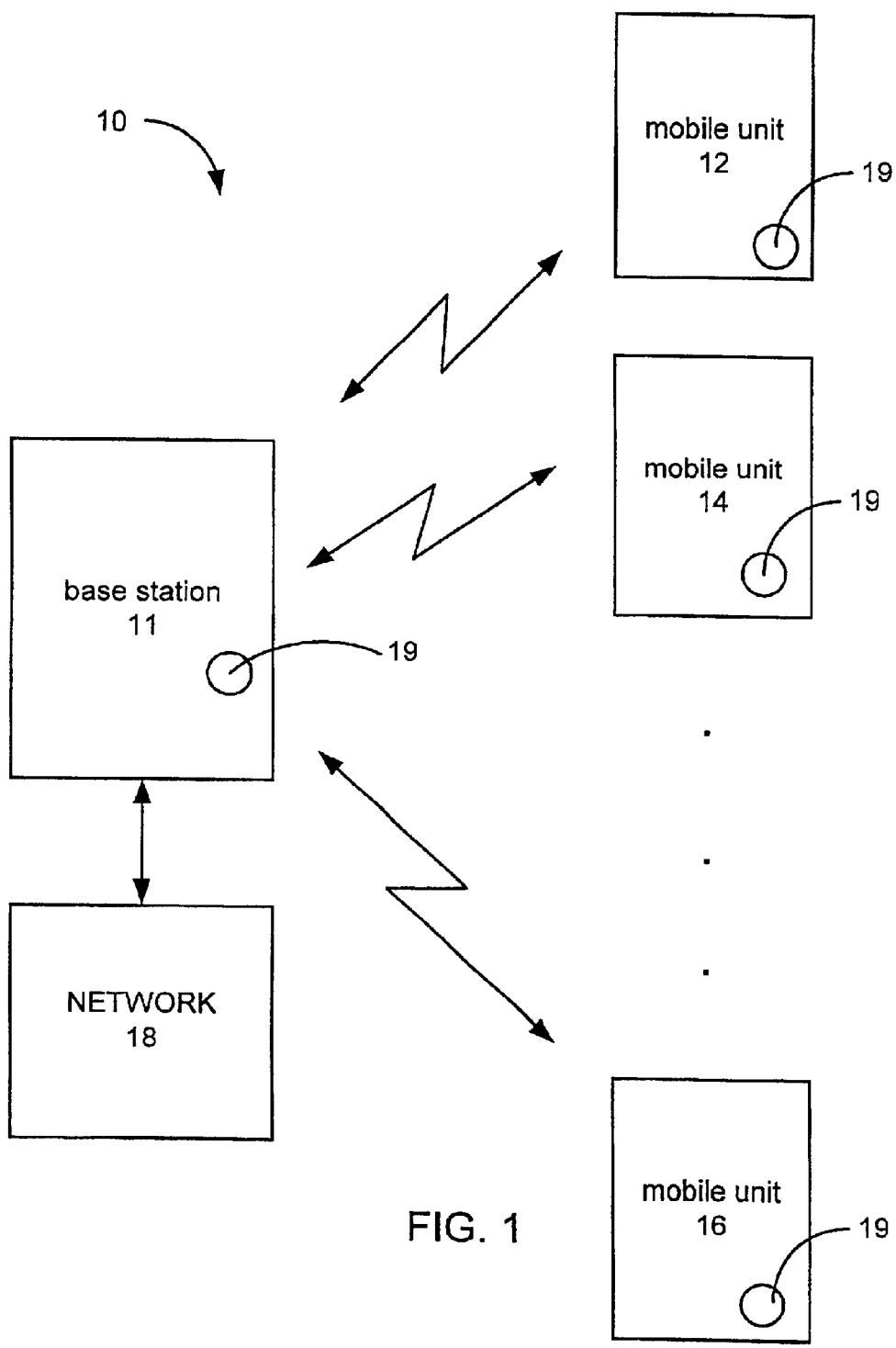
FIG. 1 is a schematic view of a cordless system that uses the invention.

To facilitate discussion, FIG. 1 is a schematic view of a cordless system 10, such as a cordless telephone system that utilizes the invention. The cordless system 10 comprises a base station 11 and a plurality of portable units 12, 14, 16. The base station 11 of the cordless system 10 is connected to a network 18. The plurality of portable units 12, 14, 16 communicate with the base station 11, which provides communications between the plurality of portable units 12, 14, 16 and the network 18. Although only three portable units 12, 14, 16 are illustrated other numbers of portable units are possible. For example there may be twelve portable units communicating to the base station 11. In this embodiment of the invention, time division multiple access (TDMA) is used to provide communication between each of the plurality of portable units 12, 14, 16 and the base station 11. The base station 11 and the plurality of portable units 12, 14, 16 each have a broadcast button 19.

Figure 2:
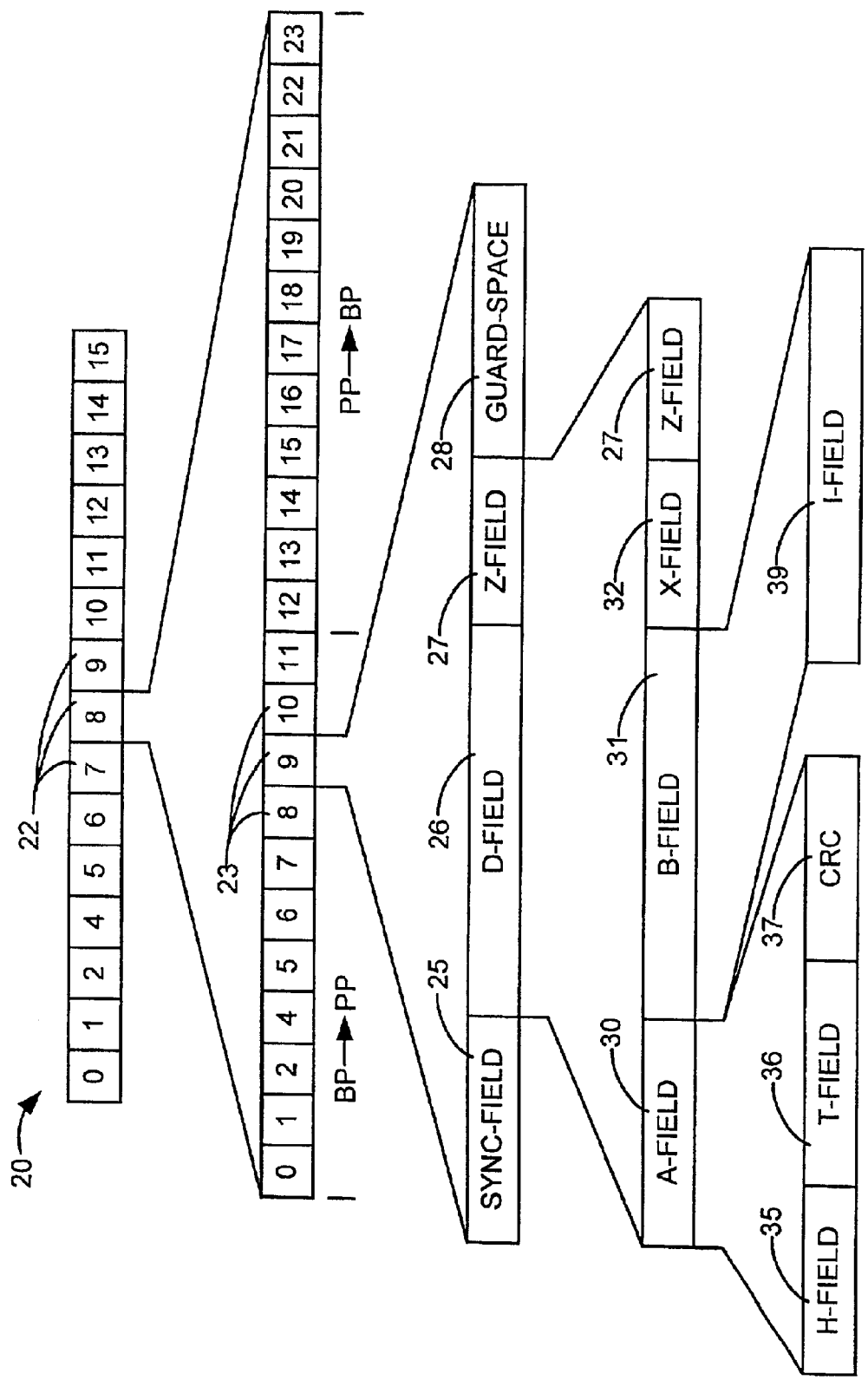
FIG. 2 shows a DECT frame structure.

FIG. 2 illustrates a DECT frame structure that uses TDMA and may be used in an embodiment of the invention. A multiframe 20 may contain sixteen frames 22. Each frame 22 of the multiframe 20 may be 10 ms (milliseconds). Each frame 22 of the multiframe 20 may be split into two sets of twelve full slots 23 of equal size. The slots 23 may be time slots. The base station 11 may transmit to the plurality of portable units 12, 14, 16 for the first 5 ms., corresponding to slots 0 to 11 (illustrated as the BP→PP (base station to portable unit transmission)). For the second 5 ms., corresponding to slots 12 to 23 (illustrated as the PP→BP (base station to portable unit transmission)) the base station may receive from the plurality of portable units 12, 14, 16. A pair of time slots 23, such as slots 0 and 12, or 1 and 13 for transmitting and receiving may form a connection (channel). Each portable unit 12, 14, 16 may be assigned a slot 23 from the first 5 ms. and a slot 23 from the second 5 ms., so that each portable unit 12, 14, 16 may be assigned a channel. Since there are twelve channels, the base station 11 may accommodate twelve portable units.

Each time slot 23 may last for 416 $\mu$s, which may correspond to 480 bits. Each time slot may be split into a 32 bit synchronization field (sync-field) 25, a 388 bit D-field 26, a four bit Z-field 27, and a 56 bit guard space 28. The D-field 26 may comprise a 64 bit A-field 30, a 320 B-field 31, and a four bit X-field 32. The A field 30 may comprise an eight bit header (H-field) 35, a forty bit tail (T-field) 36, and a 16 bit redundancy (CRC) 37. The B-field 31 may comprise a 320 bit information field (I-field) 39. The I-field 39 may be used to carry data, such as part of a digitized audio message. The header 35 may describe the information in the tail 36. Various commands and command information, such as identification commands, frequency information, slot/frame information, and slot commands may be placed in the tail 36. The base station 11 and portable units 12, 14, 16 receive messages and process the commands in the tail 36.

Figure 3:
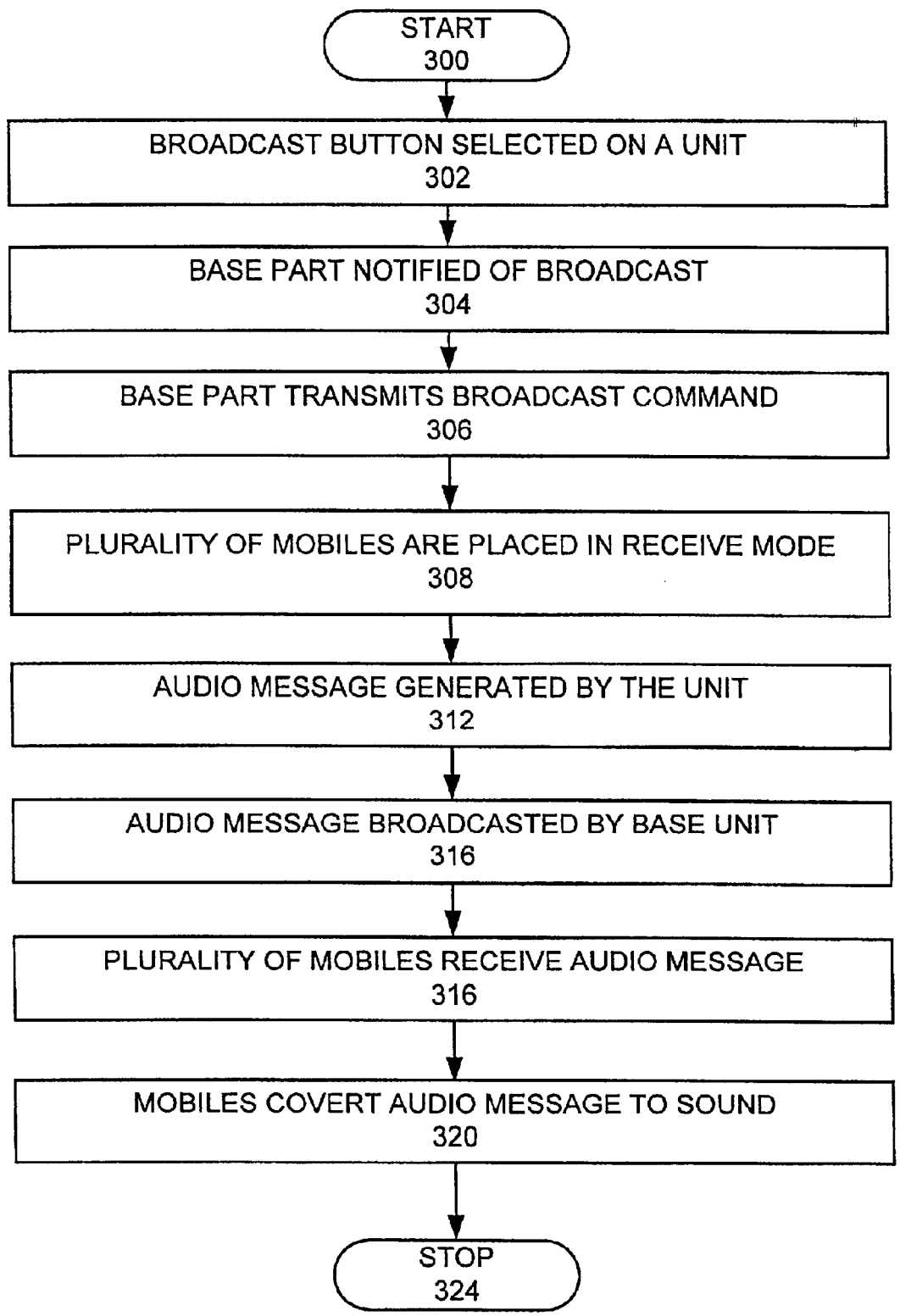
FIG. 3 is a high level flow chart of a method used in the accordance with an embodiment of the invention.

FIG. 3 is a high level flow chart of a method used in the preferred embodiment of the invention. A broadcast button 19 (FIG. 1) is selected on a unit (step 302). The base station 11 and the portable units 12, 14, 16 may have broadcast buttons 19, that allow either the base station 11 or one of the portable units 12, 14, 16 to broadcast. The broadcast button 19 may be a button dedicated only to broadcasting or one or more general purpose buttons, which may be pushed in a special sequence for broadcasting. The base station 11 is notified of the selection of the broadcast button 19 (step 304). If the broadcast button 19 on the base station 11 is selected, then the selection of the broadcast button 19 is noted by the base station 11. If the broadcast button 19 on one of the portable units 12, 14, 16 is selected, a broadcast command may be placed in the T-field 36 of a message sent to the base station 11. The base station is then notified of the selection of the broadcast button 19. In this example, the broadcast button 19 for the first portable unit 12 is selected, where the first portable unit uses slots 1 and 13. The base station 11 receives a message during slot 13 with a broadcast command in the T-field 36, which the base station 11 recognizes as a broadcast request from the first portable unit 12.

The base station 11 then transmits a broadcast command (step 306). In this example, the base station transmits broadcast command messages during slots 0 and 2–11 with a broadcast command in the T-field with a slot designation, for example slot 4. The remaining plurality of portable units 14, 16 receive the broadcast command messages. The broadcast command in the T-field causes the remaining plurality of portable units 14, 16 to go a receive only mode and become synchronized to receive signals from the designated slot, in this example slot 4 (step 308). The first portable unit 12 may transmit a plurality of messages with digitized audio information in the I-field 39 (step 312). The base station 11 receives the messages from the first portable unit 12 at slot 13 and sends broadcast messages with the same digitized audio text during slot 4, thus rebroadcasting the audio message (step 316). Since the remaining plurality of portable units 14, 16 are in a receiving mode and synchronized with slot 4, all of the remaining plurality of portable units 14, 16 receive the audio message (step 316) and access the digital data in the I-field 39 to convert the audio message to sound (step 320). The first portable unit 12 or the base station 11 may terminate the broadcast mode by having the base station 11 transmit a message that commands the remaining plurality of portable units 14, 16 to synchronize with different slots.

If the broadcast button 19 on the base station 11 is selected, then the broadcast audio message is generated at the base station 11. In such a case, the broadcast message is not received by the base station 11 through one of the slots.

In one embodiment of the invention, if a portable unit of the remaining plurality of portable units is busy (i.e. is being used for a telephone conversation) that portable unit will ignore the broadcast message.

The network 18 may be a regular telephone system. In the alternative, the network 18 may form a network of base stations. Such a network may form a large network of base stations communicating with portable units. In such a situation, it may be desirable to provide an audio broadcast to portable units associated with all of the base stations. In such a case, the base station 11 may also send the audio message to the network 18 of base stations, which broadcast the audio message to the portable units using the above mentioned method.

Figure 4:
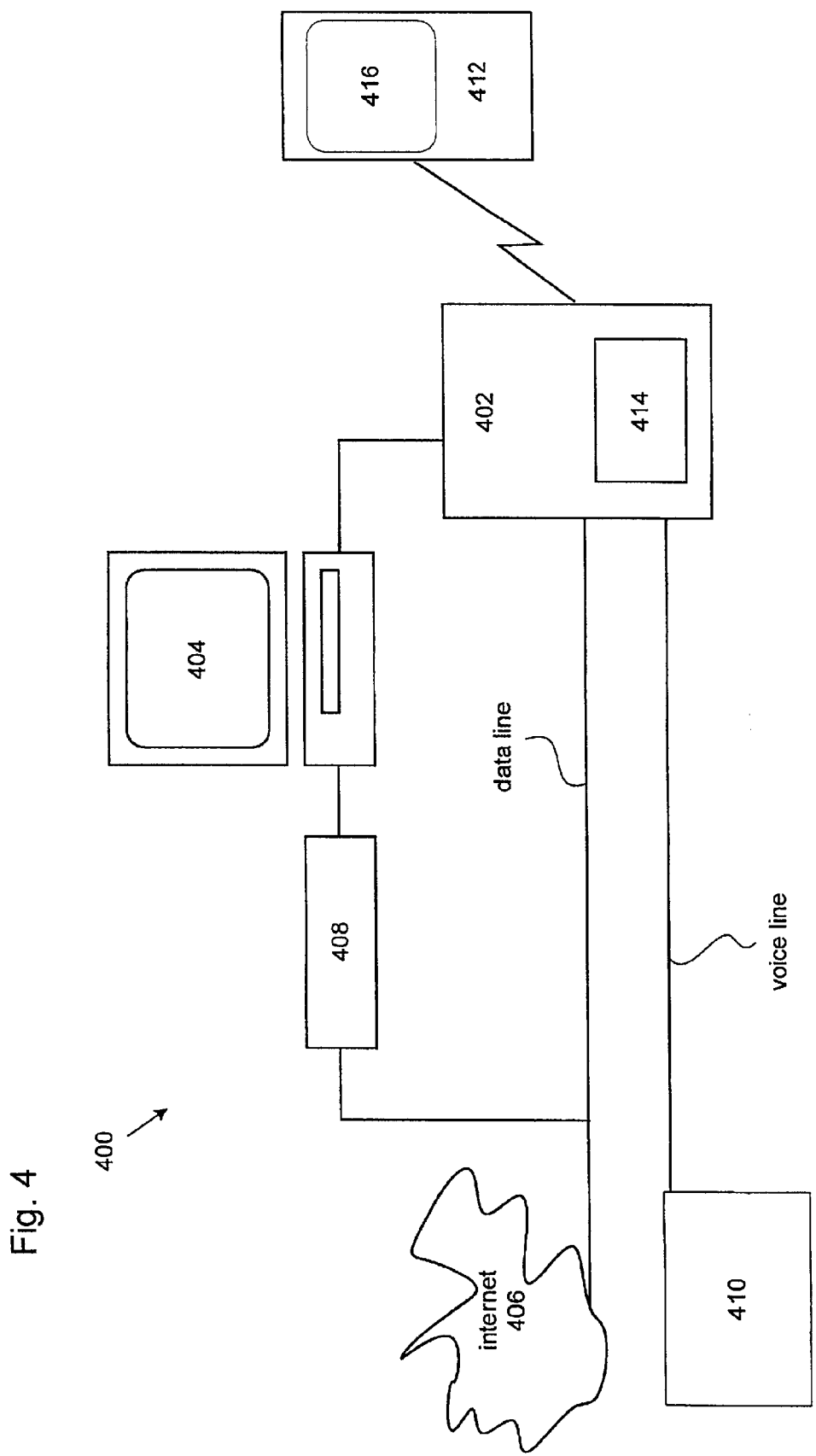
FIG. 4 is a schematic view of a cordless system capable of broadcasting a radio or streaming audio signal in accordance with an embodiment of the invention.

FIG. 4 is a schematic view of a cordless system 400 capable of broadcasting a radio or streaming audio signal in accordance with an embodiment of the invention. It should be noted that the system 400 is one embodiment of the system 10 shown in FIG. 1 and should not be consider to limit either the scope or intent of the invention. The system 400 includes a base station 402 coupled to a computer 404 which, in turn, is coupled to a streaming audio server (not shown) as part of the Internet 406 by way of a modem 408. In some cases, the base station 402 can be directly coupled to the Internet 406 in parallel with the computer 404 (such as for example, as would be the case in an intranet type of arrangement). In addition to being coupled to the Internet 406, the base station 402 is connected to a conventional telephone switching network 410 so as to be able to receive a conventional phone call.

When the base station 402 is set to a broadcast mode, a system channel, such as 23, is set to transmit only. In this way, a mobile unit 412 is able to receive the broadcast in real time. For example, if the computer 404 is receiving a streaming audio signal from the streaming audio server by way of the modem 408, the streaming audio signal is sent to a call controller unit 414 included in the base station 402. The call controller unit 414 sets at least one system channel to broadcast whereas the remaining channels are set to receive a standard telephone call. In this way, the mobile unit 412 can receive the streaming audio broadcast and in those cases when a conventional call is received, the call controller unit 414 (when instructed to do so) can switch the received call to one of the remaining channels assigned to transfer conventional calls. In so doing, the mobile unit can be configured to switch from receiving the radio (or streaming audio broadcast) to receiving the conventional phone call. Once the call has been completed, if so instructed, the call controller unit switches back to the system channel dedicated to broadcasting the radio or streaming audio signal.

In some cases, a user can select a desired station to listen to or can configure the mobile unit 412 to select any number of possible stations. For example, using an API resident on the computer 404, a user can configure an interface 416 on the mobile unit 412 to include various icons associated with particular stations or station formats. In this way, the user can quickly scan across selected stations or station formats by accessing particular icons on the interface 416. In addition, when the base station switches to a convention call mode, the interface 416 can be also switched to a configuration consistent with receiving a conventional phone call. By providing such an API, the mobile unit 412 is able to easily and efficiently provide a tool for navigating both the broadcast mode as well as the conventional phone call mode.

Figure 5:
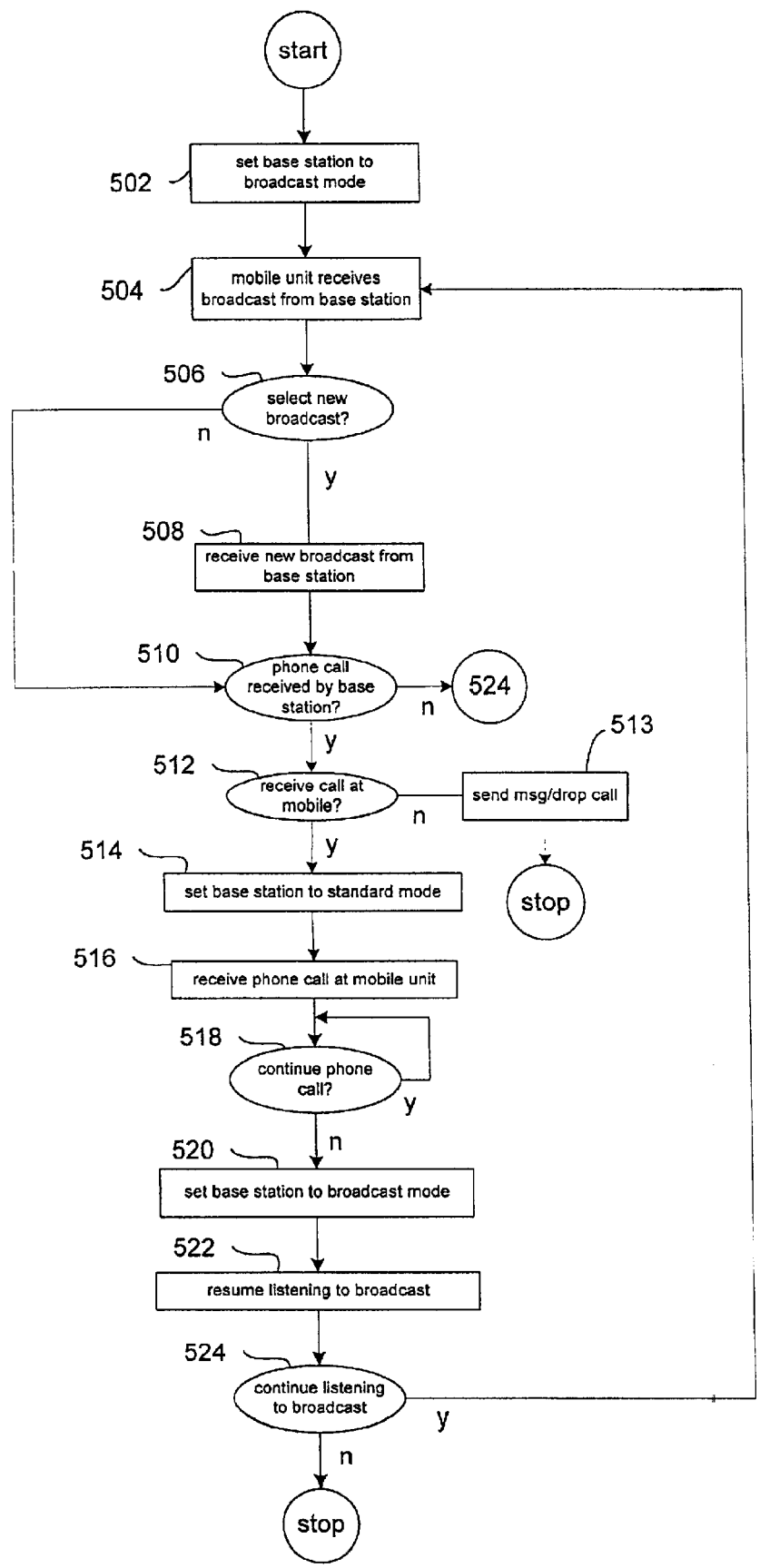
FIG. 5 shows a flowchart detailing a process for providing a selectable broadcast over broadcast mode in a digital cordless telephone system in accordance with an embodiment of the invention.

FIG. 5 shows a flowchart detailing a process 500 for providing a selectable broadcast over broadcast mode in a digital cordless telephone system in accordance with an embodiment of the invention. The process 500 begins at 502 by setting a base station of a broadcast mode. In the described embodiment, the base station is set to broadcast by, for example, dedicating a channel (or channels) to broadcast only whereas the remaining channels remain free to receive a conventional telephone call. Once set to broadcast mode, a mobile unit in communication with the base station receives the broadcast at 504. At 506, a determination is made whether or not to select a new broadcast. In one embodiment, the mobile unit includes a configurable interface that by use of an API that is resident on a computer coupled to the base station can be configured to select any number and types of stations. If a new broadcast is selected, then at 508, the mobile unit receives the new broadcast. Whether or not a new broadcast was selected, if during a broadcast, a determination is made at 510 that a conventional phone call has been received at the base station, then a determination is made at 512 whether or not the mobile unit is to receive the phone call. If the mobile unit is not to receive the phone call, then a predefined message is sent to the caller and the call is dropped at 513, otherwise control is passed to 514 where the base station is set to standard mode.

When the base station has been set to standard mode, then a call controller unit coupled to or included in the base station switches the active channel from the at least one reserved strictly for broadcast to one of the channels reserved for a conventional phone call. At 516, the phone call is received at the mobile unit and a 518, a determination is made whether to continue the phone call or not. When the phone call is to be terminated, then control is passed to 520 where the base station is set to the broadcast mode and at 522, the listening to the broadcast is resumed. At 524, a determination is made whether or not the mobile unit is to continue receiving the broadcast. When the receipt of the broadcast is to be continued, then control is passed back to 504, otherwise the process 500 stops.

Figure 6A:
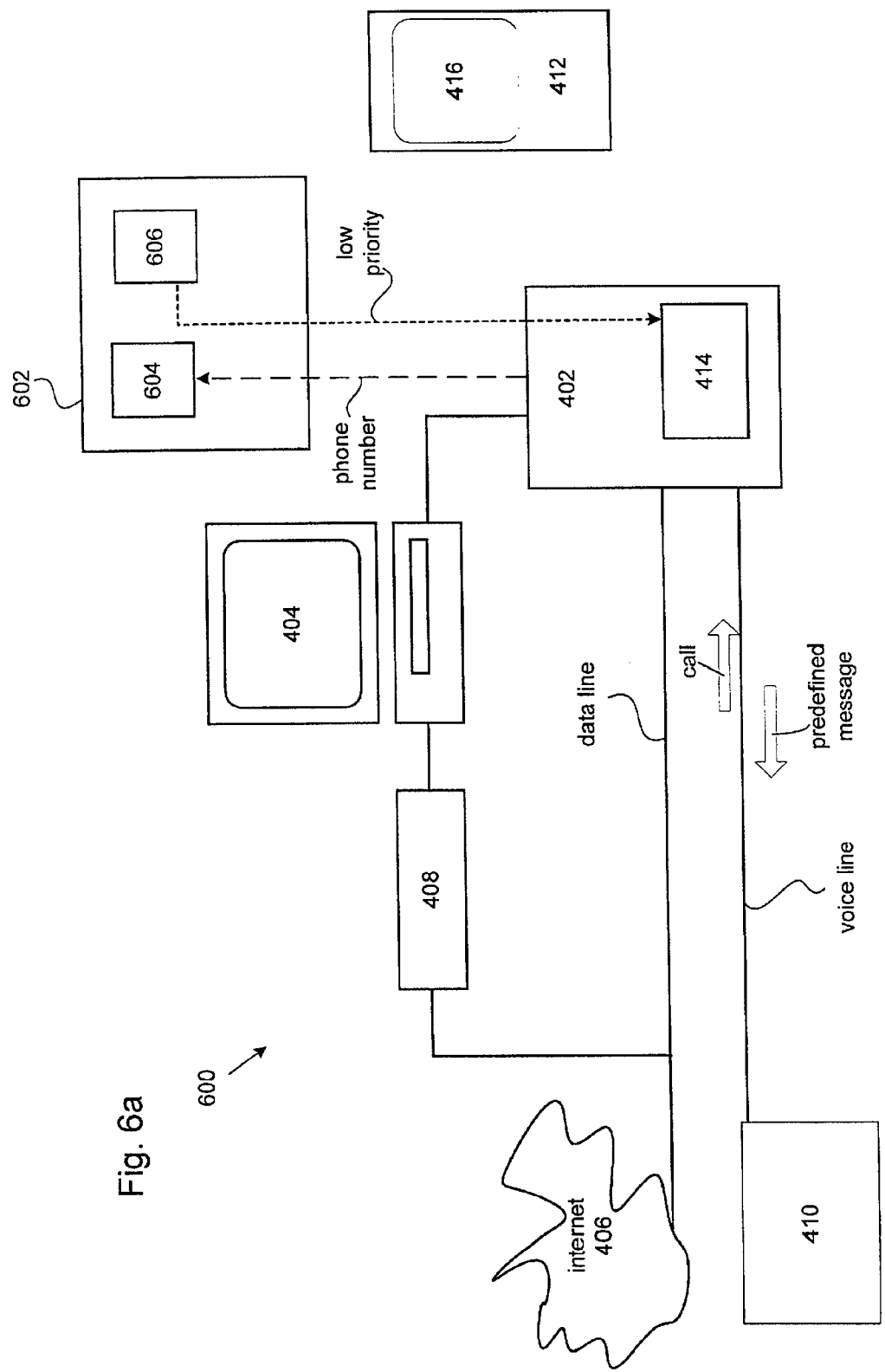
FIG. 6A is a schematic view of a cordless system arranged to direct an incoming call to a specified mobile unit in accordance with an embodiment of the invention.

FIG. 6A is a schematic view of a cordless system 600 arranged to direct an incoming call to a specified mobile unit in accordance with an embodiment of the invention. It should be noted that the system 600 can be implemented as an embodiment of the system 400 shown in FIG. 4 and should not be consider to limit either the scope or intent of the invention. The system 600 includes the base station 402 coupled to a directory 602 arranged to store any number of phone numbers in a phone number database 604, or any other appropriate caller identification, along with an associated priority level in a priority level database 606. The directory 602 is shown to be separate and distinct from the computer 404 for sake of clarity only and can, in fact, be stored in a memory device either coupled to or included in the computer 404. It should be note that if a number is listed in the phone number database 604 but not in the priority level database, then the number is assigned a lowest priority by default. In such a case, the unprioritized caller (based upon his/her unprioritized phone number) is sent a predefined message and the call is immediately dropped. In this way, calls from undesirable elements can be avoided without undue use of system resources.

In the described embodiment, the call controller unit 414 is arranged to direct an incoming call to an appropriate one of a plurality of mobile units 412. For example, when an incoming call is received, the base station 402 determines the caller's phone number and queries the directory 602 to determine if that particular phone number is listed in the phone number database 604. If the phone number is not listed, or is listed but has a low priority, then a low priority flag is passed to the call controller unit 414. The call controller unit 414 immediately responds to the receipt of the low priority flag by sending the caller a predefined message and the call is dropped.

Figure 6B:
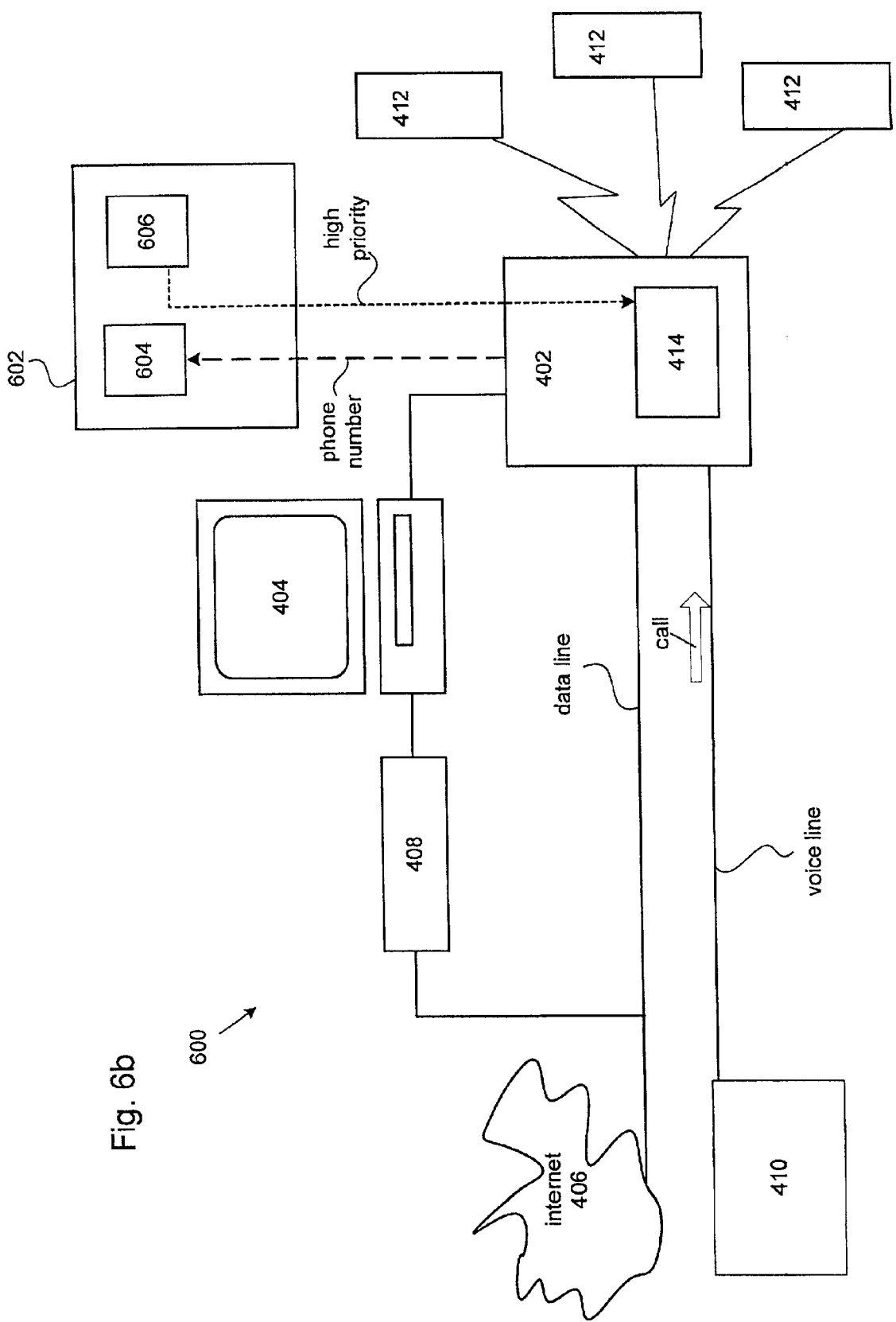
FIG. 6B illustrates those cases when the phone number is associated with a high priority, a high priority flag is passed to the call controller unit in accordance with an embodiment of the invention.

In those cases where the phone number is associated with a high priority, a high priority flag is passed to the call controller unit as illustrated in FIG. 6B. Upon receipt of the high priority flag, the call controller unit 414 broadcasts the incoming message to all, or substantially all, of the mobile units 412.

Figure 6C:
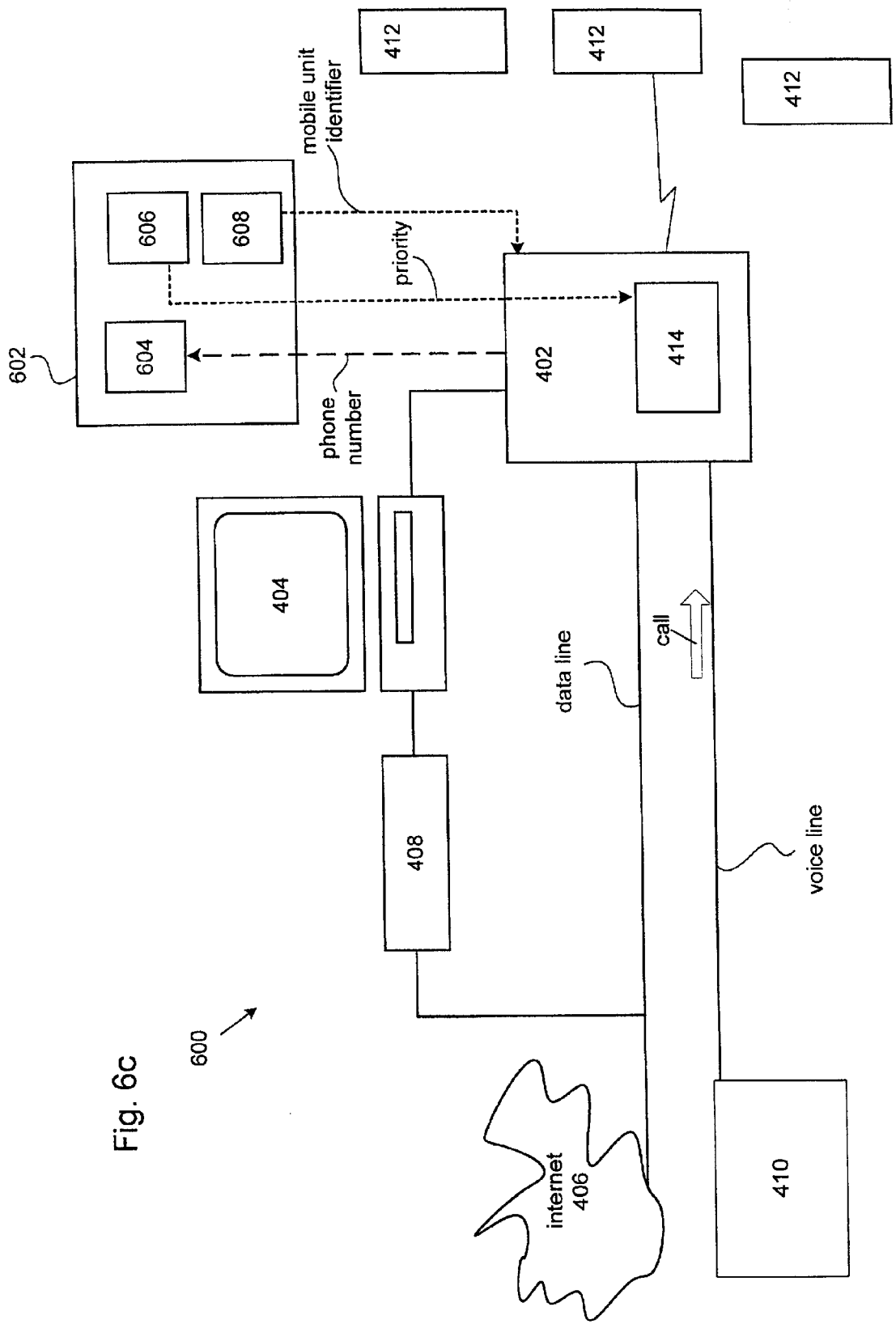
FIG. 6C illustrates the situation when a particular phone number is neither a high priority nor a low priority such that the phone number is associated with a particular mobile unit based upon a mobile unit database in accordance with an embodiment of the invention.

However, when the particular phone number is neither a high priority nor a low priority, the phone number is associated with a particular mobile unit based upon a mobile unit database 608 included, in this example, in the directory 602 as shown in FIG. 6C. In this case, the identified mobile unit (or mobile units if a group of mobile units has been selected to receive the incoming call simultaneously) is sent the incoming call by the call controller unit 414.

In some cases, a broadcast message (such as, for example, a streaming audio signal) is received by the base station 402 as shown in FIG. 6D. In this case, the call controller unit 414 sends the streaming audio signal to a selected one of the mobile units 412 that is synchronized to the broadcast system channel described above.

Figure 7:
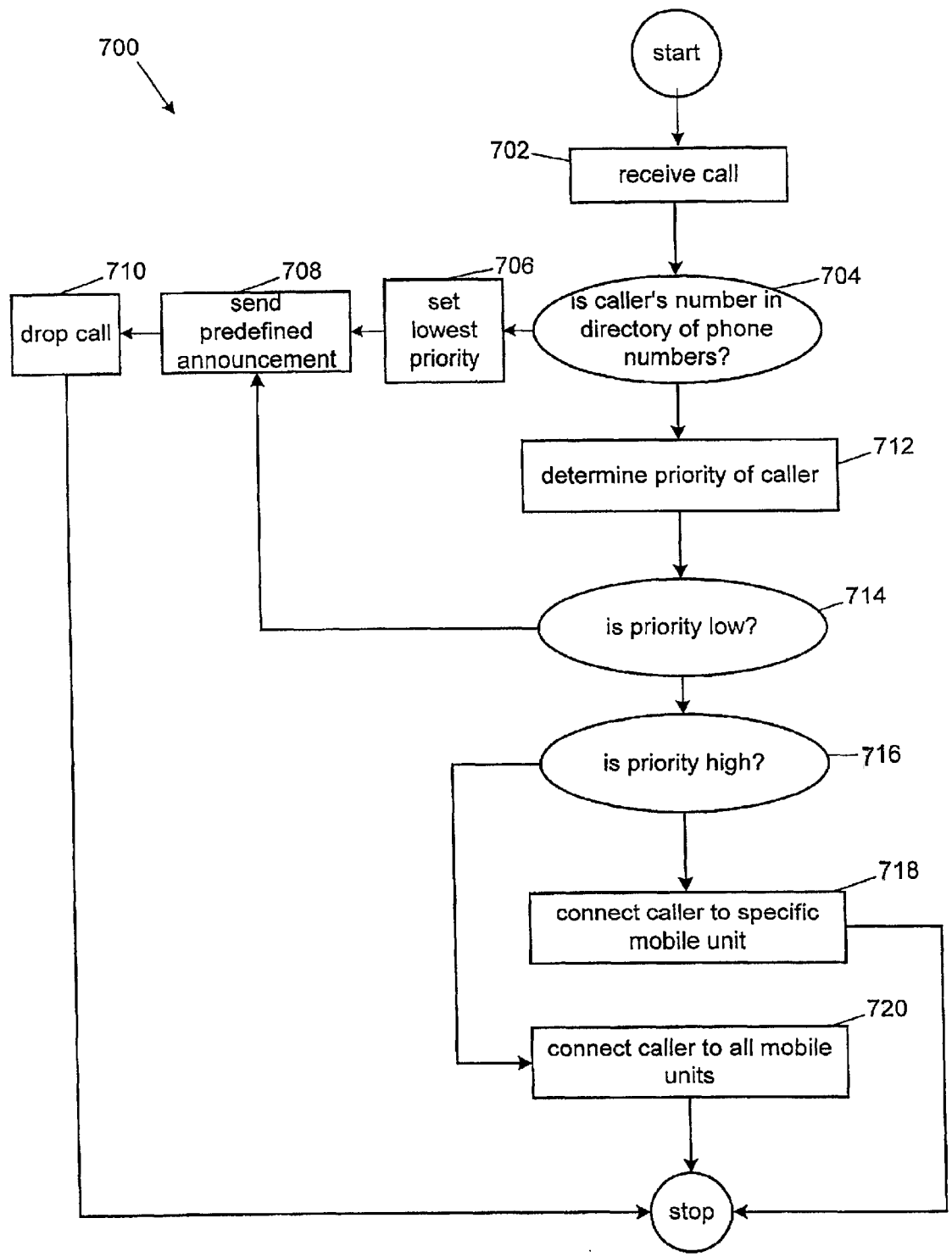
FIG. 7 is a flowchart detailing a process for providing hierarchical call control with selective broadcast audio messaging in accordance with an embodiment of the invention.

FIG. 7 is a flowchart detailing a process 700 for providing hierarchical call control with selective broadcast audio messaging in accordance with an embodiment of the invention. The process 700 begins at 702 by a call being received at the base station. At 704, a determination is made whether or not the identified number is located in the directory of phone numbers. If the identified phone number is not in the directory, then the number is assigned a lowest priority (or some other predetermined priority) at 706 and a predefined announcement is then sent to the caller at 708 after which the call is dropped at 710. Returning back to 704, if it is determined that the identified number is located in the directory, then a priority of associated with the identified phone number is returned at 712. A determination is then made whether or not the returned priority is a lowest priority (or some other predetermined priority level) at 714. If the returned priority is the lowest priority (or some other predetermined priority level), then control is passed to 708, otherwise, control is passed to 716 where a determination is made if the returned priority is a highest priority (or some other predetermined priority level). If the returned priority is determined to be the highest priority (or some other predetermined priority level), then the caller is connected to most of the mobile units based upon the returned priority at 720. In some cases, all of the mobile units are connected, whereas in other cases, only a selected group of the mobile units are connected to the caller.

Returning to 716, if it is determined that the returned priority is not the highest priority, then the caller is connected to a specific mobile unit based upon the phone number of the caller at 718.

Figure 8:
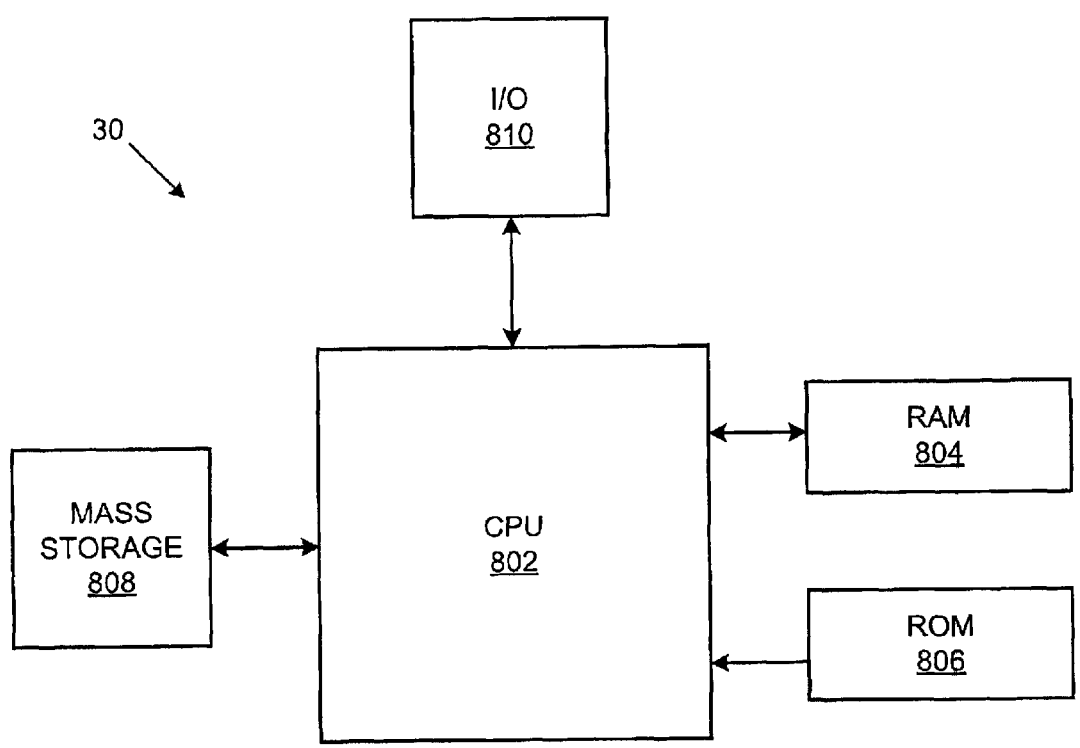
FIG. 8 illustrates a representative computer suitable for use as computers in accordance with an embodiment of the invention.

A representative computer 800 suitable for use as computers 404 of FIG. 4 is illustrated schematically in FIG. 8. Computer 800 includes a central processing unit (CPU) 802 which is coupled bidirectionally with random access memory (RAM) 804 and unidirectionally with read only memory (ROM) 806. Typically, RAM 804 is used as a "scratch pad" memory and includes programming instructions and data, including distributed objects and their associated code and state, for processes currently operating on CPU 802. ROM 806 typically includes basic operating instructions, data and objects used by the computer to perform its functions. In addition, a mass storage device 808, such as a hard disk, CD ROM, magneto-optical (floptical) drive, tape drive or the like, is coupled bidirectionally with CPU 802. Mass storage device 808 generally includes additional programming instructions, data and objects that typically are not in active use by the CPU, although the address space may be accessed by the CPU, e.g., for virtual memory or the like. Each of the above described computers optionally includes an input/output source 810 that typically includes input media such as a keyboard, pointer devices (e.g., a mouse or stylus) and/or network connections. Additional mass storage devices (not shown) may also be connected to CPU 802 through a network connection. It will be appreciated by those skilled in the art that the above described hardware and software elements, as well as the networking devices, are of standard design and construction, and will be well familiar to those skilled in the art.

While this invention has been described in terms of several preferred embodiments, there are alterations, permutations, and substitute equivalents which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. A system for providing a hierarchical call control paradigm in a cordless phone system, comprising:
    a base station operable in a broadcast mode and a standard mode;
    a plurality of mobile units communicatively coupled to the base station;
    a directory server coupled to the base station;
    a phone number database included in or coupled to the directory server arranged to store any number of phone numbers,
    a caller identification database coupled to the phone number database arranged to store a caller identifier uniquely associated with a phone number corresponding to a received phone call; and
    a priority level data base coupled to the caller identification data base arranged to provide a priority level for the caller identifier, wherein when the phone call is received, the directory server identifies a phone number of the received call, identifies a caller based upon a retrieved caller identifier associated with the identified phone number, retrieves a priority level for the identified caller, and forwards the call to a specific mobile unit based upon the priority level.

2. A system as recited in claim 1, wherein the priority level is selected from a group comprising: a lowest priority (DO NOT DISTURB), an intermediate priority, and a highest priority.

3. A system as recited in claim 2, wherein when the priority level is the lowest priority, then the incoming call is not forwarded to any of the plurality of mobile units.

4. A system as recited in claim 2, wherein when the priority level is the highest priority level, then the incoming call is broadcast to all mobile units.

5. Computer program product to provide hierarchical call control suitable for a cordless telephone system having a base station operable in a broadcast mode and a standard mode communicatively coupled to a plurality of mobile units, comprising:
   computer code for receiving a call;
   computer code for identifying a phone number associated with the call;
   computer code for identifying a priority level associated with the number; and
   computer code for forwarding the call to a specific mobile unit based upon the priority level
   computer code for broadcasting the incoming message from the base station during a single time slot of a time division;
   computer code for receiving the incoming message at the plurality of mobile units;
   computer code for converting the incoming message into sound by the plurality of mobile units; and
   computer readable medium for storing the computer code.

6. Computer program product as recited in claim 5, further comprising:
   computer code for placing the plurality of mobile units in a receiving mode.

7. Computer program product, as recited in claim 6, wherein the computer code for placing the plurality of mobile units in a receiving mode comprises computer code for synchronizing the plurality of mobile units to the single time slot.

8. Computer program product, as recited in claim 7, wherein computer code for setting the base station to the broadcast mode comprises computer code for designating the single time slot.

9. Computer program product, as recited in claim 8, wherein at least one of the plurality of mobile units is a hands free unit, wherein the computer code for converting the audio message into sound by the hands free unit is automatic, and wherein the computer code for placing of the plurality of mobile units in a receiving mode places the plurality of mobile units in a receive only mode.

10. Computer program product, as recited in claim 9, further comprising:
    computer code for originating broadcast origination signal at an additional mobile unit;
    computer code for transmitting a broadcast origination signal from the additional mobile unit to the base part; and
    computer code for transmitting the audio message from the additional mobile unit to the base part.

11. Computer program product, as recited in claim 10, wherein the computer code for placing the plurality of mobile units in a receive only mode, comprises computer code for turning on only speakers of the plurality of mobile units without turning on microphones of the plurality of mobile units.

12. Computer program product as recited in claim 5, wherein the computer code for setting the base station to the standard mode comprises computer code for synchronizing those plurality of mobile units not desiring to converse with the caller to another time slot that is different than the single time slot.

13. Computer program product as recited in claim 5, wherein the specific mobile unit is associated only with a particular mobile unit identifier.

14. Computer program product as recited in claim 5, wherein the computer program product further comprises a mobile unit identifier data base coupled to the directory server arranged to provide a mobile unit identifier.

15. Computer program product as recited in claim 14, wherein the priority level is the intermediate priority level, the mobile unit identifier data base provides a mobile unit identifier arranged to identify a selected one of the plurality of mobile units suitably configured to receive the incoming call.

16. A method to provide a hierarchical call control suitable for a cordless telephone system having a base station operable in a broadcast mode and a standard mode communicatively coupled to a plurality of mobile units, comprising:
    receiving a call;
    identifying a phone number associated with the call;
    identifying a priority level associated with the number;
    forwarding the call to a specific mobile unit based upon the priority level;
    broadcasting the incoming message from the base station during a single time slot of a time division;
    receiving the incoming message at the plurality of mobile units; and
    converting the incoming message into sound by the plurality of mobile units.

17. The method, as recited in claim 16, further comprising:
    placing the plurality of mobile units in a receiving mode.

18. The method, as recited in claim 17, wherein the placing the plurality of mobile units in a receiving mode comprises synchronizing the plurality of mobile units to the single time slot.

19. The method, as recited in claim 18, wherein setting the base station to the broadcast mode comprises designating the single time slot.

20. The method, as recited in claim 19, wherein at least one of the plurality of mobile units is a hands free unit, wherein converting the audio message into sound by the hands free unit is automatic, and wherein the placing of the plurality of mobile units in a receiving mode places the plurality of mobile wilts in a receive only mode.

21. The method, as recited in claim 20, further comprising:
    originating broadcast origination signal at an additional mobile unit;
    transmitting a broadcast origination signal from the additional mobile unit to the base part; and
    transmitting the audio message from the additional mobile unit to the base part.

22. The method, as recited in claim 21, wherein placing the plurality of mobile units in a receive only mode, comprises turning on only speakers of the plurality of mobile units without turning on microphones of the plurality of mobile units.

23. The method as recited in claim 16, wherein setting the base station to the standard mode comprises synchronizing those plurality of mobile units not desiring to converse with the caller to another time slot that is different than the single time slot.

24. The method as recited in claim 16 wherein a specific mobile unit is associated only with a particular mobile unit identifier.

* * * * *